United States Patent [19]

Nakamura et al.

[11] E Patent Number: Re. 32,943

[45] Reissued Date of Patent: Jun. 6, 1989

[54] PROCESS FOR COOKING LIGNOCELLULOSIC MATERIAL IN THE PRESENCE OF HYDROXYANTHRACENES AND DERIVATIVES THEREOF

[75] Inventors: Masato Nakamura; Yoshika Nomura, both of Tokyo; Iwahiro Uchimoto, Chiba, all of Japan

[73] Assignee: Honshu Seishi Kabushiki Kaisha, Tokyo, Japan

[21] Appl. No.: 233,962

[22] Filed: Feb. 12, 1981

Related U.S. Patent Documents

Reissue of:

[64] Patent No.: 4,181,565
Issued: Jan. 1, 1980
Appl. No.: 940,582
Filed: Sep. 8, 1978

U.S. Applications:

[63] Continuation-in-part of Ser. No. 758,837, Jan. 12, 1977, abandoned.

[30] Foreign Application Priority Data

Dec. 10, 1976 [JP] Japan ..... 51-148492

[51] Int. Cl.[4] ..... D21C 3/20

[52] U.S. Cl. ..... 162/76; 162/72; 162/83; 162/90

[58] Field of Search ..... 162/70, 72, 76, 83, 162/84, 86, 90; 260/396 R, 505 C; 562/467; 568/733

[56] References Cited

U.S. PATENT DOCUMENTS

| | | | |
|---|---|---|---|
| 1,890,040 | 12/1932 | Luttringhaus et al. | 260/396 R X |
| 2,883,826 | 4/1959 | Smith et al. | 162/83 X |
| 2,920,010 | 1/1960 | Voiret | 162/83 X |
| 4,012,280 | 3/1977 | Holton | 162/72 X |
| 4,036,681 | 7/1977 | Holton | 162/72 X |

FOREIGN PATENT DOCUMENTS

| | | | |
|---|---|---|---|
| 986662 | 4/1976 | Canada . | |
| 43403 | 4/1976 | Japan | 162/72 |
| 109303 | 9/1976 | Japan . | |
| 112903 | 10/1976 | Japan . | |

OTHER PUBLICATIONS

*Elsevier's Encyclopedia of Organic Chemistry,* vol. 13, 1946, pp. 277–279, 281, 291, 300–302, 304, 650 & 703.

*Primary Examiner*—Arthur L. Corbin
*Attorney, Agent, or Firm*—Banner, Birch, McKie & Beckett

[57] ABSTRACT

An improved process for the production of pulp from lignocellulosic material characterized by the employment of a cooking aid is disclosed. The cooking of the lignocellulosic material is carried out in the presence of a small amount of a compound selected from the group consisting of hydroxyanthracenes and derivatives thereof.

10 Claims, No Drawings

PROCESS FOR COOKING LIGNOCELLULOSIC MATERIAL IN THE PRESENCE OF HYDROXYANTHRACENES AND DERIVATIVES THEREOF

Matter enclosed in heavy brackets [ ] appears in the original patent but forms no part of this reissue specification; matter printed in italics indicates the additions made by reissue.

This is a continuation-in-part of Ser. No. 758,837, filed Dec. 2, 1977, now abandoned.

BACKGROUND OF THE INVENTION

This invention relates to a process for the production of pulp. More particularly, the invention relates to a process for the production of pulp from lignocellulosic materials by carrying out the cooking in the presence of a small amount of a novel type of cooking aid selected from the group consisting of hydroxyanthracenes and derivatives thereof. The cooking aid can be added to a cooking liquor in any of the conventional alkaline or sulfite or the like cooking processes. The term "alkaline cooking process" or simply "alkaline process" herein used includes various alkaline cooking processes such as a kraft process, a soda process, a sodium carbonate process and the like. Similarly, the term "sulfite cooking process" or simply "sulfite process" herein used includes various sulfite cooking processes such as an alkaline sulfite process, a neutral sulfite process, a bisulfite process, and the like.

In the field of producing pulp from lignocellulosic material such as wood, bagasse, hemp and the like, numerous attempts have been made, repeatedly, from ancient times to improve the cooking yield, the rate of cooking and the quality of the product pulp, aiming at the economical production of good quality pulp with decreased consumption of raw material and of energy. For example, instead of the conventional kraft process in which lignocellulosic material such as wood is subjected to treatment by a cooking liquor comprising essentially sodium hydrate and sodium sulfide, a modified process thereof which is usually called a "polysulfide process" and is characterized by being subjected to treatment with a cooking liquor comprising a sodium polysulfide is currently more popularly employed. Various other modifications, for example, the addition of borohydride, hydrazine, hydroxylamine or the like have also been proposed and tried. Most such modified processes, however, have not been useful in a practical manner because in some cases total or partial change of the processing equipment is required. In other cases, there is a significant increase in production costs. In still other cases, the process is not applicable to soft woods or to hard woods, or both. Thus, except for said polysulfide process, none of the above-mentioned prior art processes is more than a laboratory model.

The object of the present invention is to provide a novel process for the production of pulp free from the disadvantages mentioned above.

THE INVENTION

The novel process of the present invention is characterized by the selective use of a specific type of a cooking aid comprising at least a member selected from the group consisting of hydroxyanthracenes and derivatives thereof. More particularly, in one aspect of the present invention, there is provided a process for producing alkaline pulp by carrying out the cooking of lignocellulosic materials such as wood, bagasse, hemp and the like in an alkaline cooking liquor in the presence of a small amount of hydroxyanthracene or a derivative thereof which is added as a novel type of cooking aid. In another aspect of the present invention, there is provided a process for producing sulfite pulp by carrying out the cooking of said lignocellulosic materials in a cooking liquor comprising sulfite in the presence of a small amount of the same cooking aid as mentioned above. As a result of effecting the cooking of such lignocellulosic materials as mentioned above in the presence of a specific amount of said novel cooking aid according to the present invention, the solution velocity of lignin from said lignocellulosic materials is substantially increased, and in turn the rate of cooking is also substantially increased. The cooking yield in pulp production is also substantially improved as compared with the prior art process using the same degree of cooking. This is because hydroxyanthracene or a derivative thereof added to the cooking liquor functions as a cooking aid to promote the dissolution of lignin into the cooking liquor as well as to prevent the degradation of cellulose and hemicellulose throughout the cooking treatment. As a result of using this novel cooking aid, the cooking yield and also the quality of the resulting pulp are improved, and the rate of cooking is increased. Incidental to the increased rate of cooking, the amounts of cooking chemicals and steam required for heating are also substantially reduced.

Typical compounds which can be advantageously employed as said cooking aid in the practice of the present invention include hydroxyanthracenes and derivatives thereof having the following general formula:

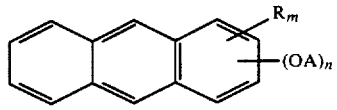

wherein m is 0, 1 or 2, n is 1 or 2, R is COOA, $SO_3A$ or H, and A is H or Na; providing that when m is 1, R is at least one of COOA or $SO_3A$ and R cannot attach to (substitute on) the middle ring;

when m is 0 or 2, R is H;

when R is H and m is 2, two carbon atoms of the anthracene nucleus lose their double bonds, and each such carbon atom takes the form of $CH_2$ instead of CH, in which case one H of each $CH_2$ is not counted as an R and may be substituted by OA.

Representative compounds included within the generic formula and which can be used in the practice of the present invention include the following:

(1) 1,4-dihydro-9,10-dihydroxyanthracene and its Na salt;

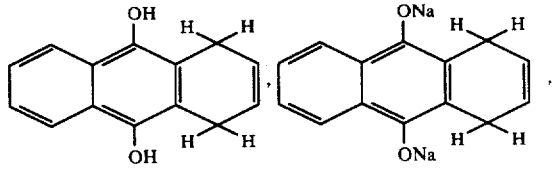

(2) 1-hydroxyanthracene and its Na salt;

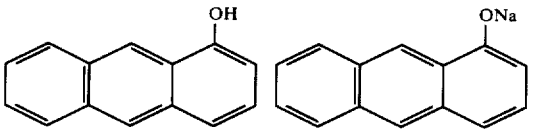

(3) 2-hydroxyanthracene and its Na salt;

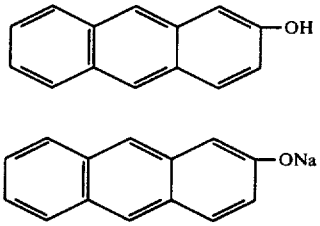

(4) 9-hydroxyanthracene and its Na salt;

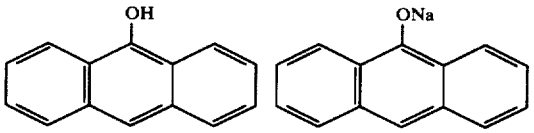

(5) 9,10-dihydroanthranol and its Na salt;

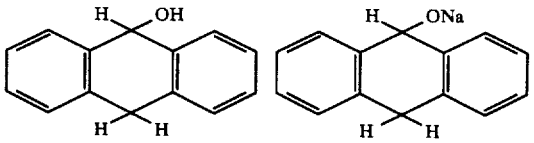

(6) 1,2-dihydroxyanthracene and its Na salt;

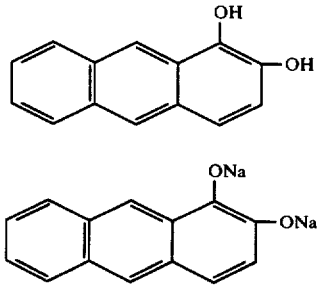

(7) 2,3-dihydroxyanthracene and its Na salt;

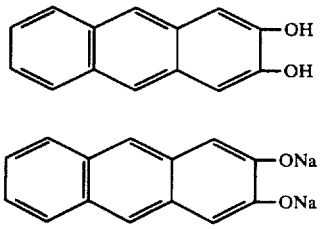

(8) 2,6-dihydroxyanthracene and its Na salt;

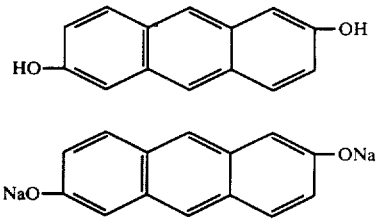

(9) 9,10-dihydroxyanthracene and its Na salt;

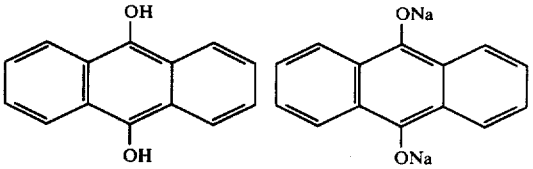

(10) 9,10-dihydroanthracene-9,10-diol and its Na salt;

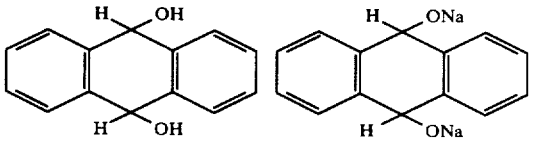

(11) 9,10-dihydroxyanthracene-2-carboxylic acid and its Na salt;

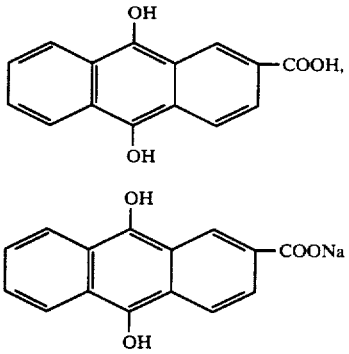

(12) 9,10-dihydroxyanthracene-1-sulphonic acid and its Na salt;

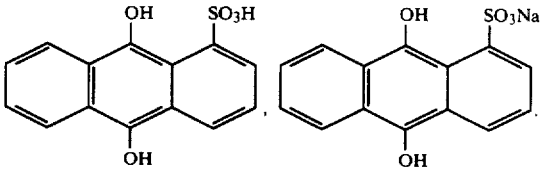

The compounds defined by the above general formula include those wherein R represents H, COOX wherein X is H or Na, or $SO_3Y$ wherein Y is H or Na; A represents H or Na; m represents 0, 1 or 2; and n represents 1 or 2. The case wherein R represents H in the above general formula refers to a case in which at least one carbon atom in the anthracene nucleus loses its double bond to change from CH to $CH_2$ in the same position. Namely, the compounds defined by the above general formula include those obtained by the addition of at least one hydrogen atom to the carbon atom in the anthracene nucleus to have it lose its double bond and change from its CH form to $CH_2$ form in the same position.

These compounds generally include dihydroxyanthracene, dihydroxydihydroanthracene, [carboxydihydroanthracene], *carboxydihydroxyanthracene*, as well as [dihydroanthracenesulfonic] *dihydroxyanthracene sulfonic* acids including their sodium salts, dihydroxyanthracene carboxylic acids including their sodium salts, which are most advantageously employed in the practice of the present invention.

The compounds Nos. 1, 2 and 9 are particularly preferred as the cooking aid in the present invention.

These novel cooking aid compounds are preferably used in an amount in the region of 0.005–3% by weight based on the bone dry weight of the raw material chips or the lignocellulosic materials to be added to the cooking liquor. If the compound is used in an amount in the region of 0.01–0.1% by weight based on the same standard, optimum results will be obtained.

The compounds represented by the general formula, such as dihydroxyanthracenes, can easily be synthesized from naphthoquinone and butadiene by making use of Diels-Alder reaction. The preparation of these compounds is illustrated by the known preparations of Compounds 1–12, as follows.

(a) Compound (1) can be prepared as afore-described from naphthoquinone and butadiene by the Diels-Alder reaction. This process is disclosed on page 2, left column, lines 27–32 of U.S. Pat. No. 1,890,040.

(b) Compound (2) can be prepared by the process as disclosed on page 277 of Elsevier's Encyclopedia of Organic Chemistry, Volume 13.

(c) Compound (3) can be prepared by the process as disclosed on page 278 of the same reference identified in (b).

(d) Compounds (4) through (10) can be prepared by the processes disclosed on pages 279, 281, 291, 300, 301, 302 and 304, respectively, of the same reference identified in (b).

(e) Compound (11) can be prepared by the process as disclosed on page 650 of the same reference identified in (b).

(f) Compound (12) can be prepared by the process as disclosed on page 703 of the same reference identified in (b).

These compounds when used as cooking aids are easy to dissolve in the cooking liquor. In order to carry out the process of the present invention, no special change is required with respect to the cooking conditions except that a specified amount of said cooking aid is merely added to an ordinary cooking liquor. The following examples will illustrate the preferred embodiments of the present invention.

EXAMPLE 1

600 g. of softwood chips were placed in a 4-liter capacity autoclave, to which was added a kraft process cooking liquor having 17% active alkali and 25% sulfidity. Then, dihydroxydihydroanthracene, i.e., 1,4-dihydro-9,10-dihydroxyanthracene, in an amount of 0.05% by weight based on the bone dry weight of the chips was added to the same cooking liquor and cooking was carried out at 165° C. for 75 minutes.

For comparative purposes, the same experiment was repeated except that said dihydroxydihydroanthracene was omitted. The results of these experiments were as shown in Table 1, below.

TABLE 1

| | Kraft process cooking with dihydroxydihydroanthracene (present invention) | Kraft process cooking without dihydroxydihydroanthracene (prior art) |
|---|---|---|
| Cooking yield (%) | 48.6 | 46.5 |
| Kappa number | 42 | 51 |
| Burst index* | 6.9 | 6.2 |
| Breaking length (km) | 8.2 | 7.0 |
| Tear factor | 170 | 170 |

*determined by JIS P-8210(Testing Method for Strength of Paper Pulp)

EXAMPLE 2

700 g. of hardwood chips were placed in a 4-liter capacity autoclave, to which a soda process cooking liquor having a 15.5% (as $Na_2O$) caustic soda and dihydroxyanthracene, i.e., 9,10-dihydroxyanthracene, in an amount of 0.02% by weight based on the bone dry weight of the chips was added and cooking was carried out at 155° C. for 75 minutes.

Next, for comparative purposes, the same experiment was repeated except that said dihydroxyanthracene was omitted. The results of these experiments are shown in Table 2, below.

TABLE 2

| | Soda process cooking with dihydroxyanthracene (present invention) | Soda process cooking without dihydroxyanthracene (prior art) |
|---|---|---|
| Cooking yield (%) | 53.9 | 53.0 |
| Kappa number | 50 | 78 |
| Burst index* | 4.3 | 3.0 |
| Breaking length (km) | 6.1 | 4.5 |
| Tear factor | 110 | 100 |

*determined by JIS P-8210(Testing Method for Strength of Paper Pulp)

EXAMPLE 3

700 g. of hardwood chips were placed in a 4-liter capacity autoclave, to which was added a sodium carbonate process cooking liquor containing 10% sodium carbonate and 0.1% by weight, based on the bone dry weight of the chips, of sodium dihydroxyanthracenecarboxylate, i.e., 9,10-dihydroxyanthracene-2-carboxylic acid (Na salt), and cooking was carried out at 180° C. for 20 minutes. Then, the cooked chips were beaten by a disk refiner to a freeness of 450 cc.

For comparative purposes, the same experiment was repeated except that said sodium dihydroxyanthracenecarboxylate was omitted. The results of these experimints are shown in Table 3, below.

TABLE 3

| | Sodium carbonate process cooking with sodium dihydroxyanthracene-carboxylate (present invention) | Sodium carbonate process cooking without sodium dihydroxyanthracene-carboxylate (prior art) |
|---|---|---|
| Cooking yield (%) | 82.0 | 78.9 |
| Burst index* | 1.8 | 1.7 |
| Breaking length (km) | 3.2 | 2.5 |
| Folds, double | 20 | 14 |
| Ring crush resistance | 14.2 | 13.5 |
| Concora crush resistance | 19.5 | 19.0 |

*determined by JIS P-8210(Testing Method for Strength of Paper Pulp)

EXAMPLE 4

400 g. of flax was placed in a 4-liter capacity autoclave, to which was added a cooking liquor containing 18% sodium sulfite and 3% caustic soda, both based on the weight of raw material, and sodium dihydroxyanthracenesulfonate, i.e., 9,10-dihydroxyanthracene-1-sulfonic acid (Na salt), in an amount of 0.05% based on the bone dry weight of the raw material, and cooking was carried out at 180° C. for 4 hours. Separately, for comparative purposes, the same experiment was repeated except that said sodium dihydroxyanthracenesulfonate was omitted. The results of these experiments are shown in Table 4, below.

TABLE 4

| | Sulfite cooking with sodium dihydroxyanthracenesulfonate (present invention) | Sulfite cooking without sodium dihydroxyanthracenesulfonate (prior art) |
|---|---|---|
| Cooking yield (%) | 62.5 | 58.5 |
| Kappa number | 8 | 12 |
| Breaking length (km) | 8.9 | 7.6 |
| Tear factor | 190 | 170 |

What is claimed is:

1. An improved cooking process for the production of pulp from lignocellulosic material comprising cooking lignocellulosic material in a cooking liquor, the improvement comprising admixing in said cooking liquor an amount, sufficient to increase the cooking rate of said lignocellulosic material, of a cooking aid comprising at least one member selected from the group consisting of compounds having the formula:

[ 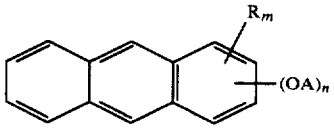 ]

-continued

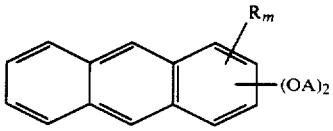

[wherein m is 0, 1 or 2, n is 1, or 2, R is COOA, $SO_3A$ or H, and A is H or Na; providing that when m is 1, R is at least one of COOA or $SO_3A$ and R cannot attach to the middle ring; when m is 0 or 2, R is H; and] *wherein, m is 1 when R is COOA or $SO_3A$ and R cannot attach to the middle ring, m is 2 when R is H, and A is H or Na; and* when R is H and m is 2, two carbon atoms of the anthracene nucleus lose their double bonds, and each such carbon atom takes the form of $CH_2$ instead of CH, in which case one H of each $CH_2$ is not counted as an R and may be substituted by OA.

2. The process of claim 1, wherein said cooking aid is at least one member selected from the group consisting of [dihydroxyanthracene,] dihydroxydihydroanthracene, [carboxydihydroanthracene and dihydroanthracene sulfonate] *dihydroxyanthracene sulfonic acids and their sodium salt and dihydroxyanthracene carboxylic acids and their sodium salts.*

3. The process of claim 1, wherein said cooking aid is used in an amount of from about 0.005 to about 3% by weight based on the bone dry weight of lignocellulosic material.

4. The process of claim 1, wherein said cooking aid is used in an amount of from about 0.01 to about 0.1% by weight based on the bone dry weight of lignocellulosic material.

5. The process of claim 3, wherein said cooking aid is 1,4-dihydro-9,10-dihydroxyanthracene or its sodium salt.

[6. The process of claim 3, wherein said cooking aid is 1-hydroxyanthracene or its sodium salt.]

[7. The process of claim 3, wherein said cooking aid is 9,10-dihydroxyanthracene or its sodium salt.]

[8. The process of claim 3, wherein said cooking aid is 2-hydroxyanthracene or its sodium salt.]

[9. The process of claim 3, wherein said cooking aid is 9-hydroxyanthracene or its sodium salt.]

[10. The process of claim 3, wherein said cooking aid is 9,10-dihydroanthranol or its sodium salt.]

[11. The process of claim 3, wherein said cooking aid is 1,2-dihydroxyanthracene or its sodium salt.]

[12. The process of claim 3, wherein said cooking aid is 2,3-dihydroxyanthracene or its sodium salt.]

[13. The process of claim 3, wherein said cooking aid is 2,6-dihydroxyanthracene or its sodium salt.]

14. The process of claim 3, wherein said cooking aid is 9,10-dihydroanthracene-9,10-diol or its sodium salt.

15. The process of claim 3, wherein said cooking aid is 9,10-dihydroxyanthracene-2-carboxylic acid or its sodium salt.

16. The process of claim 3, wherein said cooking aid is, 9,10-dihydroxyanthracene-1-sulphonic acid or its sodium salt.

17. The process of each of claims 1, [6, 7, 8, 9, 10, 11, 12, 13,] 2, 14, 15 or 16, wherein said cooking liquor is an alkaline process cooking liquor.

18. The process of each of claims 1, [6, 7, 8, 9, 10, 11, 12, 13,] 2, 14, 15 or 16, wherein said cooking liquor is a sulfite process cooking liquor.

* * * * *